United States Patent [19]

Seki et al.

[11] Patent Number: 5,075,873
[45] Date of Patent: Dec. 24, 1991

[54] DRAWING COORDINATE SYSTEM AND SCALE SETTING METHOD

[75] Inventors: Masaki Seki; Takashi Takegahara, both of Tokyo; Akira Kajitani, Yamanashi, all of Japan

[73] Assignee: Fanuc, Ltd., Minamitsuru, Japan

[21] Appl. No.: 465,218

[22] PCT Filed: Jul. 5, 1989

[86] PCT No.: PCT/JP89/00676
§ 371 Date: Mar. 13, 1990
§ 102(e) Date: Mar. 13, 1990

[87] PCT Pub. No.: WO90/00778
PCT Pub. Date: Jan. 25, 1990

[30] Foreign Application Priority Data

Jul. 15, 1988 [JP] Japan .................. 63-174922

[51] Int. Cl.⁵ .............................. G06K 1/00
[52] U.S. Cl. ................... 395/140; 340/706
[58] Field of Search ................ 364/518–523, 364/235 MS, 900 MS, 929.3 MS, 928–928.5 MS, 237.7 MS, 234–234.4 MS; 340/706–708, 712; 358/75; 346/134, 139 R, 154

[56] References Cited

U.S. PATENT DOCUMENTS 4,577,214  3/1986  Klie et al. .................. 358/78

OTHER PUBLICATIONS

English Abs. of Japanese A 62278679, Dec. 3, 87.
English Abs. of Japanese A 61108175, May 27, 86.
English Abs. of Japanese A-63104105, May 8, 88.
English Abs. of Japanese A-60 204006, Oct. 15, 85.
English Abs of Japanese A-59 114609, Jul. 2, 84.

*Primary Examiner*—Arthur G. Evans
*Attorney, Agent, or Firm*—Staas & Halsey

[57] ABSTRACT

The invention relates to a method of setting the coordinate system ($X_D-Y_D$) of a figure drawn on a drawing (DRW) on a tablet surface (8c), and of setting scale. The method includes entering coordinates in a tablet coordinate system ($X_T-Y_T$) by selecting two points ($P_1$, $P_2$) whose coordinates are known in the drawing coordinate system, calculating the distance between the two points in the tablet coordinate system and the distance between the two points in the drawing coordinate system using the abovementioned coordinates and the known coordinates, and obtaining a scale S of the figure based on a ratio of the distances between the two points in both coordinate systems. The drawing coordinate system ($X_D-Y_D$) is placed upon the tablet surface based on the scale S and the coordinates of the two points ($P_1$, $P_2$) in each of the coordinate systems.

2 Claims, 7 Drawing Sheets

| | EXECUTE | POINT DEFINITION | | STRAIGHT-LINE DEFINITION | | | CIRCLE DEFINITION | |
|---|---|---|---|---|---|---|---|---|
| | 11 | 12 | | 13 | | | 14 | |
| | SHAPE DATA INPUT | • | | — | \| | ∠a | ⊙ | ⊙ |
| | NEW DEFINITION / INITIAL SETTING | | | | / | | ○ | |
| CCT | COORDINATE SYSTEM SETTING / SHAPE GROUP SELECTION | ⊙ | ▦ | | / | | | |

DRAWING COORDINATE SYSTEM AND SCALE SETTING METHOD

DESCRIPTION

1. Technical Field

This invention relates to a method of setting a drawing coordinate system and scale. More particularly, the invention relates to a method of setting the coordinate system and scale of a figure drawn on a drawing set upon a tablet.

2. Background Art

There are cases where a drawing as drawn free hand or the shape of a manufactured article on a drawing which does not include dimensions is defined. In such case, the drawing is placed upon a tablet sensing area of a tablet, the tablet device is made to recognize the scale of the drawing or the drawing coordinate system, (the scale or the drawing coordinate system is set), and then a transformation matrix is obtained for transforming the coordinates of the tablet coordinate system into the coordinates of the drawing coordinate system. Thereafter, the coordinates of points on the drawing are found in the tablet coordinate system, and these coordinates are transformed into those in the drawing coordinate system by the aforementioned transformation matrix. This processing is repeated to define the shape of the manufactured article on the drawing.

Figure 6:
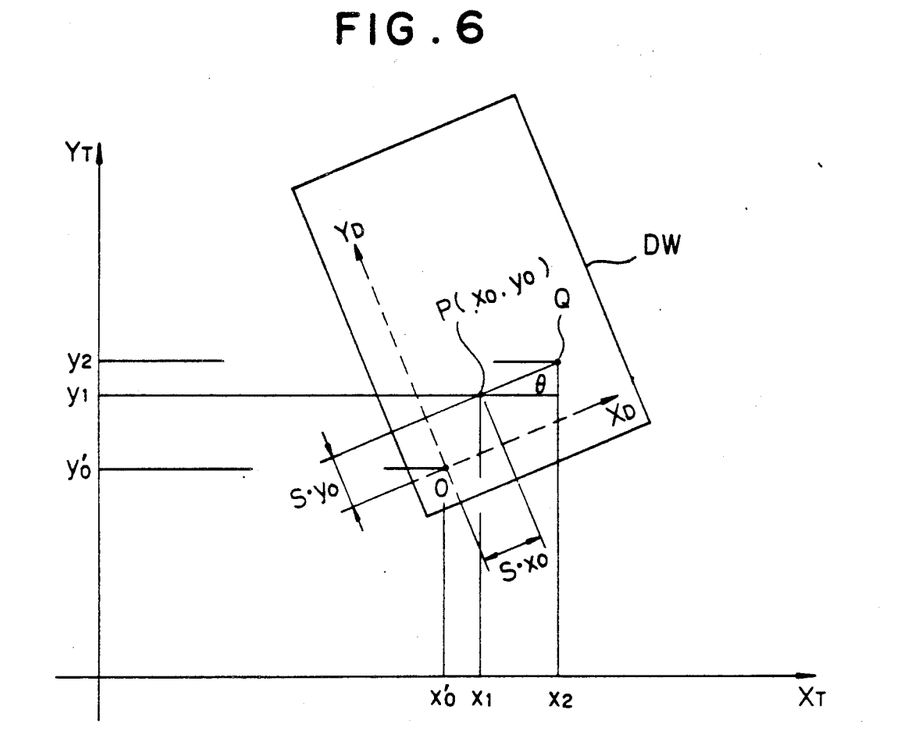
FIG. 6 is a view for describing a conventional method of setting a coordinate system.

The method of setting the scale and the drawing coordinate system will be described with reference to FIG. 6. First, the scale is set by directly entering a drawing scale value "S" from a keyboard. Next, one point P on a drawing DW placed upon a tablet is selected and the coordinates $(x_0, y_0)$ of this point in the drawing coordinate system are entered from the keyboard. After which a point Q on the drawing DW which will render a line segment PQ parallel to or coincident with the X axis of the drawing coordinate system is entered, thereby setting the drawing coordinate system. More specifically, the system uses the initially set scale S to obtain axial distance components $S \cdot x_0$, $S \cdot y_0$, in the tablet coordinate system $X_T \cdot Y_T$, from the point P to the origin O of the drawing coordinate system. The system thereafter point at distances of $S \cdot x_0$, $S \cdot y_0$ from the point P along the respective axes and, regarding this point as being the origin O of the drawing coordinate system, sets the drawing coordinate system on the tablet surface. If S represents the scale, $(x_0', y_0')$ the coordinates of the origin O in the tablet coordinate system and $\theta$ the angle of inclination between the two coordinate systems, then transformation equations for transforming coordinates $(x,y)$ in the tablet coordinate system into coordinates $(x',y')$ in the drawing coordinate system will be as follows:

$$\begin{pmatrix} x' \\ y' \end{pmatrix} = (1/S) \begin{pmatrix} \cos\theta & \sin\theta \\ -\sin\theta & \cos\theta \end{pmatrix} \begin{pmatrix} x - x_0' \\ y - y_0' \end{pmatrix} \quad (1)$$

$$x_0' = x_1 - (S \cdot x_0 \cos\theta - y_0 \sin\theta) \quad (2)$$

$$y_0' = x_1 - (S \cdot x_0 \cos\theta + y_0 \sin\theta) \quad (3)$$

$$\theta = \tan^{-1}(y_2 - y_1)/x_2 - x_1) \quad (4)$$

where $(x_1, y_1), (x_2, y_2)$ are the coordinates of points P, Q in the tablet coordinate system $X_T \cdot Y_T$.

However, with the conventional method of setting scale and drawing coordinate system, the setting of scale and the setting of the drawing coordinate system involve two entirely different operations. As a result, the setting procedure is a troublesome one.

In addition, the conventional method cannot be applied unless the X-axis or Y-axis direction on the drawing is already known.

SUMMARY OF THE INVENTION

Accordingly, an object of the present invention is to provide a method in which a drawing coordinate system and scale can be set by one and the same operation, and in which the drawing coordinate system and scale can be set without knowing the directions of axes on the drawing.

The present invention provides a method of setting the coordinate system and scale of a figure drawn on a drawing set upon a tablet.

Coordinates $(xt_1, yt_1)$, $(xt_2, yt_2)$ in a tablet coordinate system are obtained by selecting two points P1, P2 on a drawing, the coordinates of which points in the drawing coordinate system are already known, and the distance between these two points in the tablet coordinate system is calculated. The distance between the two points in the drawing coordinate system is calculated using coordinates $(xf_1, yf_1)$, $(xf_2, yf_2)$ in the drawing coordinate system. A scale S of the drawing is obtained based upon a ratio of the distance between the two points in the drawing coordinate system and the distance between the two points in the tablet coordinate system. The drawing coordinate system is set on the tablet surface based on the scale S and the coordinates of the two point P1, P2 in the drawing coordinate system and in the tablet coordinate system.

DESCRIPTION OF THE PREFERRED EMBODIMENT

Figure 1:
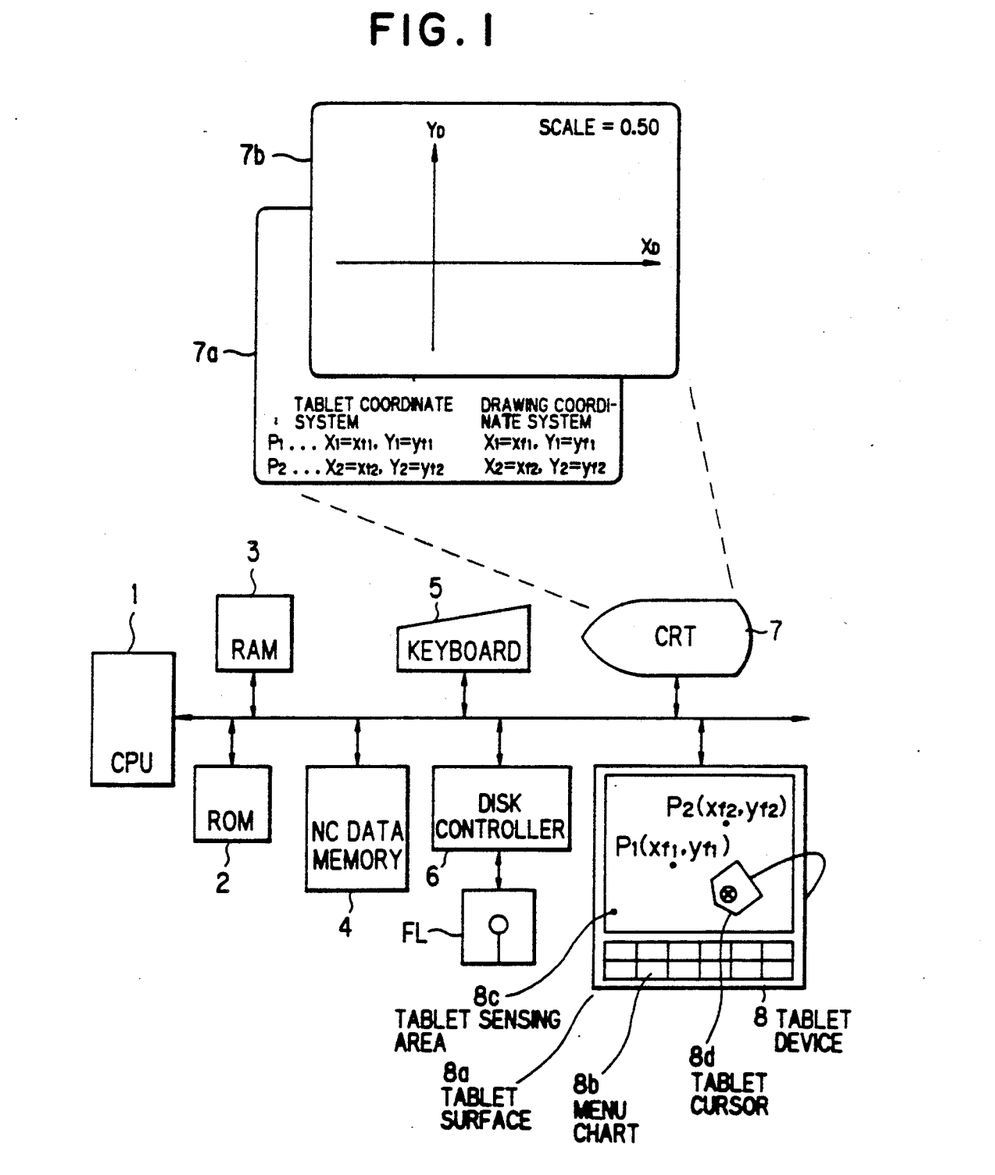
FIG. 1 is a block diagram of an NC unit having an automatic programming function for realizing the present invention.

FIG. 1 is a block diagram of an NC unit having an automatic programming function for realizing the present invention.

Numeral 1 denotes a processor, 2 a ROM, 3 a RAM for storing defined figure elements as well as the results of processing, 4 an NC data memory for storing created NC data, 5 a keyboard, 6 a disk controller, FL a floppy, 7 a graphic display unit (CRT), and 8 a tablet device.

In the tablet device 8, numeral 8a denotes a tablet surface, 8b a menu chart, 8c a tablet sensing area, and 8d a tablet cursor. The menu chart 8b is affixed to the tablet surface 8a. By using the tablet cursor 8d to select prescribed items written on the menu chart 8b, various items and data can be entered. Further, by moving the tablet cursor 8d on the tablet sensing area 8c and picking a desired point, the selected position can be entered in the tablet coordinate system.

Figure 2:
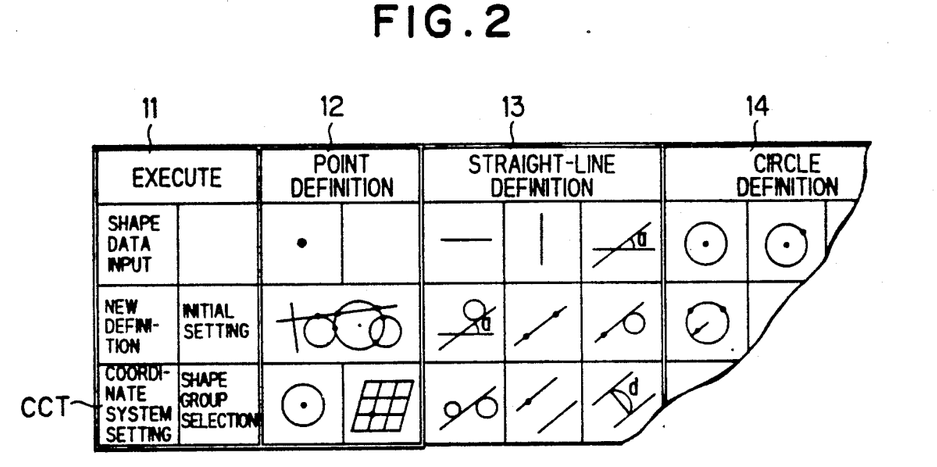
FIG. 2 is a view for describing the principal portions of a menu chart in the present invention.

FIG. 2 is a view for describing the principal portions of the menu chart 108b, in which numeral 11 denotes an "EXECUTE" section, 12 a "POINT DEFINITION" section, 13 a "STRAIGHT-LINE DEFINITION" section, and 14 a "CIRCLE DEFINITION" section. CCT in the "EXECUTE" section 11 represents a "COORDINATE SYSTEM SETTING" item.

Figure 3:
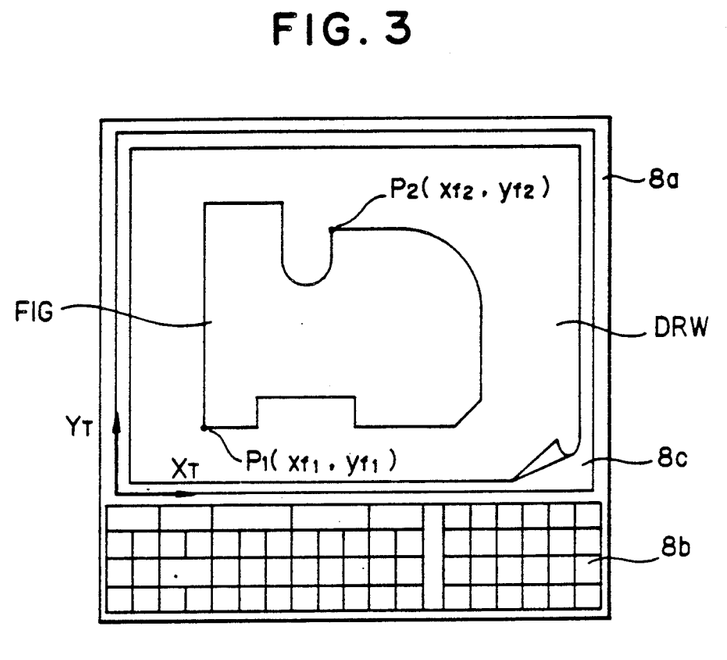
FIG. 3 is a view showing a drawing placed upon a tablet surface.

FIG. 3 is a view showing a drawing DRW of the figure FIG of a manufactured part, which is drawn freehand, placed on the tablet sensing area 8c of the tablet device 8.

Figure 4A:
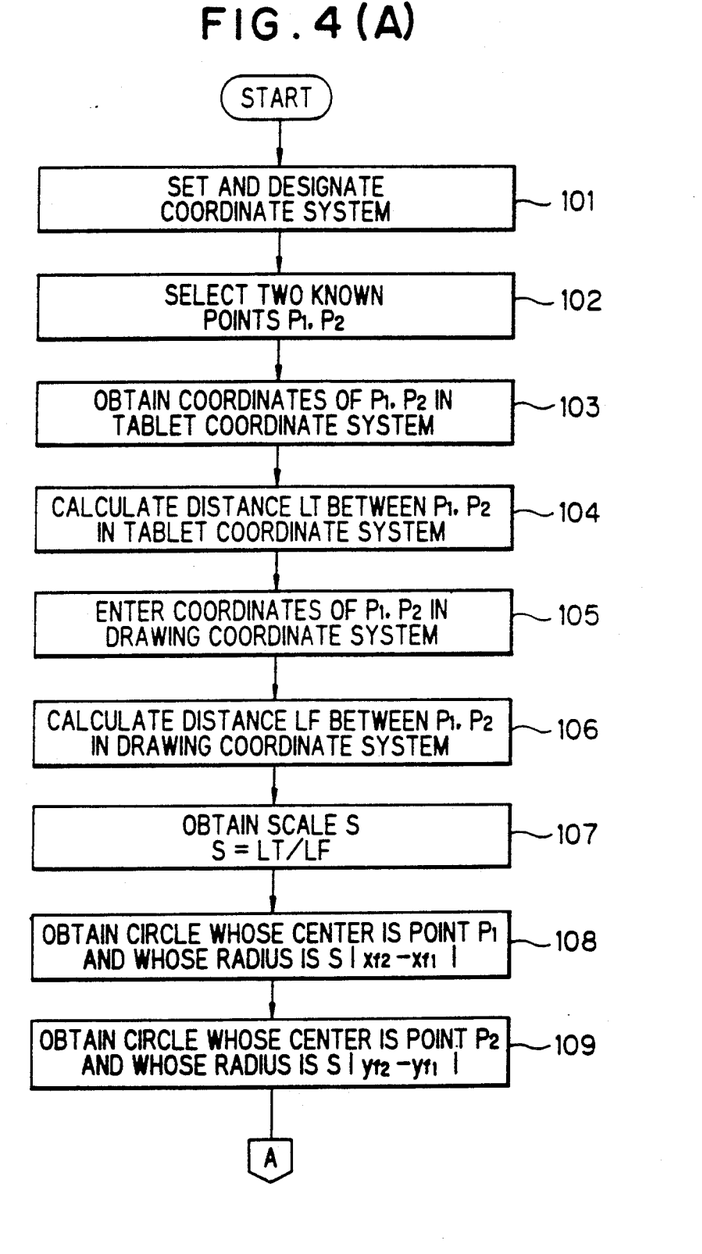
FIG. 4A and FIG. 4B are a flowchart of processing according to the present invention.
Figure 4B:
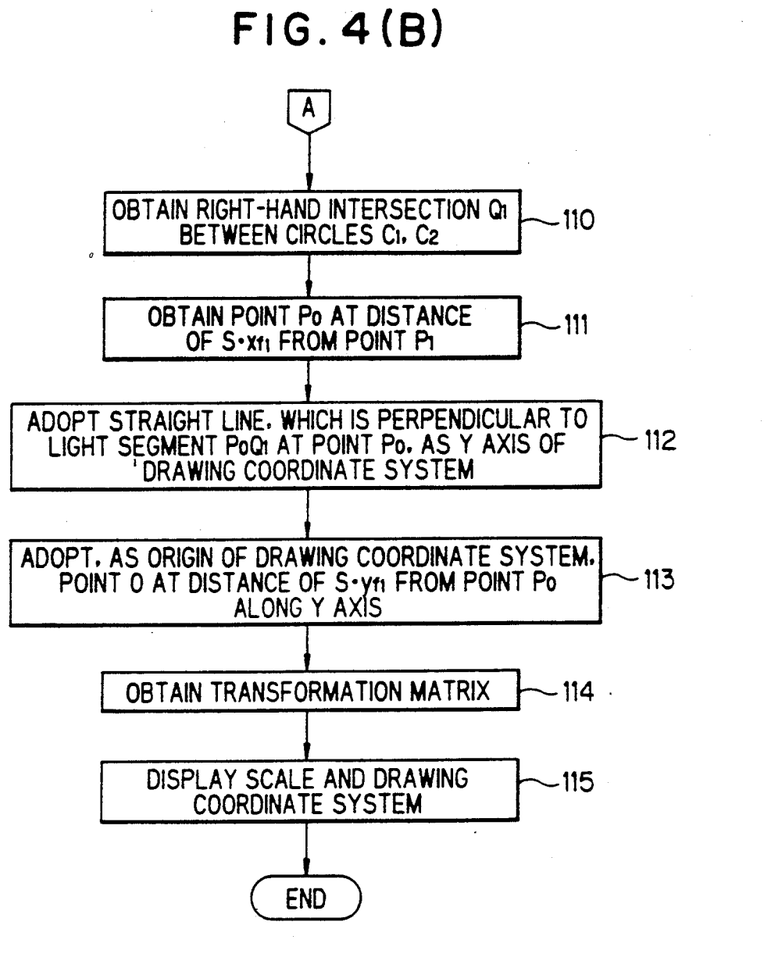
Figure 5:
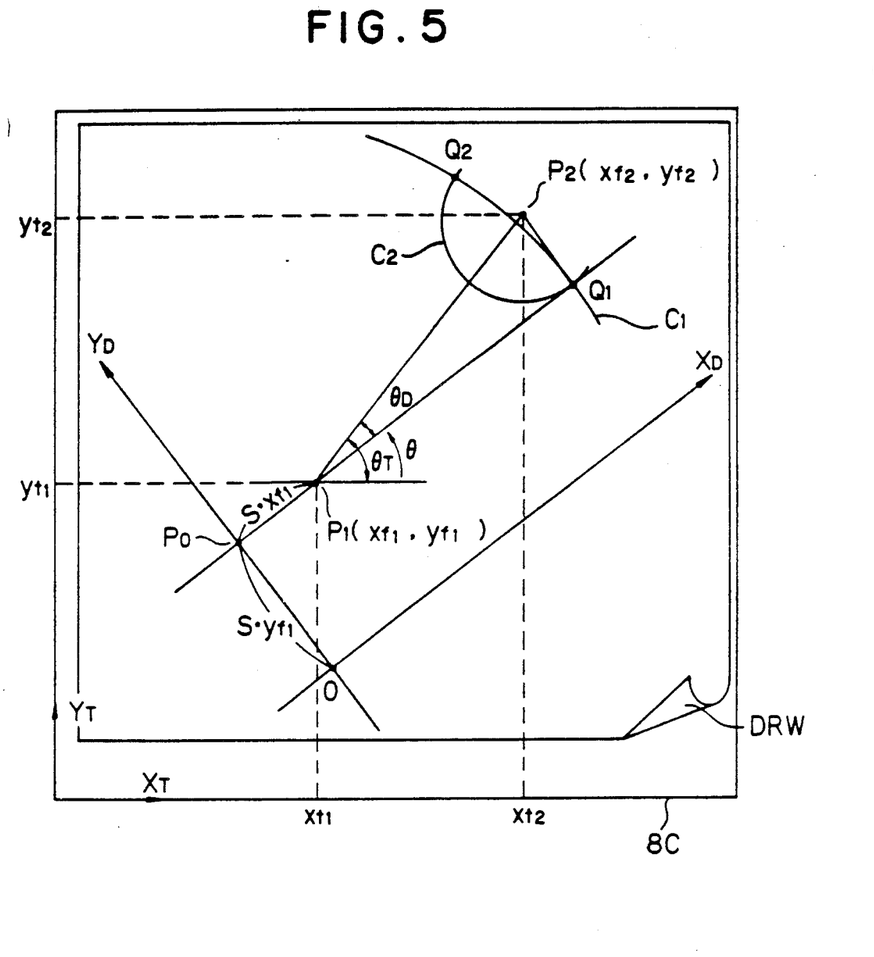
FIG. 5 is a view for describing the present invention.

FIG. 4 is a flowchart of processing for setting a drawing coordinate system and scale according to the present invention, and FIG. 5 is a view for describing the flowchart. The method of the invention for setting the drawing coordinate system and scale will now be described on the assumption that the drawing DRW (FIG. 3) has been placed upon the tablet sensing area 8c. It is assumed that a system program for executing drawing coordinate systems and scale processing has been stored in the RAM 3 from the floppy FL in advance, and that the drawing coordinate system to be set is a standard coordinate system (right-hand rectangular coordinate system).

First, using the tablet cursor 8d, the operator selects the "COORDINATE SETTING" item CCT from the menu chart 8b shown in FIG. 2 (step 101). As a result, a message for specifying two points of known coordinates in the drawing coordinate system is displayed on the display screen of the graphic display unit 7. Therefore, in response to the message, the operator uses the tablet cursor 8d to select two points $P_1$, $P_2$ (see FIG. 5) that are located in the tablet sensing area 8c and whose coordinates is the drawing coordinate system are evident (step 102).

When the points $P_1$, $P_2$ have been chosen, the processor 1 obtains coordinates $(xt_1, yt_1)$, $(xt_2, yt_2)$ of these two points in the tablet coordinate system $X_T$-$Y_T$, computes a distance LT between these two points in accordance with the following equation:

$$LT = \sqrt{(xt_2 - xt_1)^2 + (yt_2 - yt_1)^2} \quad (5)$$

and stores the distance in the RAM 3 (step 104).

Next, the operator enters coordinates $(xf_1, yf_1)$, $(xf_2, yf_2)$ of the two points $P_1$, $p_2$ in the drawing coordinate system by the keyboard 5 or the like (step 105). As a result, the processor 1 uses the entered coordinates of the two points $P_1$, $P_2$ in the drawing coordinate system to calculate a distance LF between the two points in the drawing coordinate system in accordance with the following equation (step 106):

$$LF = \sqrt{(xf_2 - xf_1)^2 + (yf_2 - yf_1)^2} \quad (6)$$

compares the distance LF between the two points in the drawing coordinate system and the distance LT between the two points in the tablet coordinate system, obtains the figure scale $S = LT/LF$ and stores the scale in the RAM 3 (step 107).

When the scale S has been obtained, the processor 1 performs processing for setting the drawing coordinate system based on the scale S and the coordinates of the two points $P_1$, $P_2$. More specifically, the processor obtains a circular arc $C_1$ (see FIG. 5) whose center is the point $P_1$ and whose radius is $S \cdot |xf_2 - xf_1|$ (step 108), a circular arc $C_2$ whose center is the point $P_2$ and whose radius is $S \cdot |yf_2 - yf_1|$ (step 109), and a point of intersection $Q_1$, which is the right-hand intersection of two points of intersection $Q_1$, $Q_2$ between the circular arcs $C_1$, $C_2$ (step 110). The reason for specifying the right-hand intersection $Q_1$ is that the orientation of the X axis of a right-hand rectangular coordinate system is on the right-hand side.

Next, the processor obtains $S \cdot xf_1$, which is found by multiplying the X component $xf_1$ of point $P_1$ in the drawing coordinate system by scale S, and obtains a point $P_0$ found by offsetting point $P_1$ leftward by a distance of $S \cdot xf_1$ along the line segment $P_1Q_1$ (step 111). A straight line perpendicular to the line segment $P_0Q_1$ at point $P_0$ is adopted as the Y axis of the drawing coordinate system $X_D$-$Y_D$ (step 112).

The processor then obtains $S \cdot yf_1$, which is found by multiplying the Y component $yf_1$ of point $P_1$ in the drawing coordinate system by the scale S, obtains a point O found by offsetting point $P_0$ downward by a distance of $S \cdot yf_1$ along the Y axis of the drawing coordinate system, adopts the point O as the origin of the drawing coordinate system $X_D$-$Y_D$, obtains a straight line perpendicular to the Y axis at point O, and adopts this straight line as the X axis of the drawing coordinate system (step 113).

When the drawing coordinate system has been set, the processor 1 obtains a transformation matrix for transforming coordinates in the tablet coordinate system $X_T$-$Y_T$ into coordinates in the drawing coordinate system $X_D$-$Y_D$, and stores the matrix in the RAM 3 (step 114). The transformation matrix is obtained as follows: Angles of inclination $\theta_T$, $\theta_D$ of the straight line $P_1P_2$ in the tablet coordinate system $X_T$-$Y_T$ and drawing coordinate system $X_D$-$Y_D$ are obtained from the following equations:

$\theta_T = \tan^{-1}(yt_2 - yt_1)/(xt_2 - xt_1)$ $\theta_D = \tan^{-1}(yf_2 - yf_1)/(xf_2 - xf_1)$ and the angle of inclination $\theta$ of the drawing coordinate system with respect to the tablet coordinate system is obtained from the following equation:

$\theta = \theta_T - \theta_D$

Accordingly, transformation equations for transforming coordinates (x,y) in the tablet coordinate system into coordinates (x,,y,) in the drawing coordinate system are as follows:

$$\begin{pmatrix} x' \\ y' \end{pmatrix} = (1/S) \begin{pmatrix} \cos\theta & \sin\theta \\ -\sin\theta & \cos\theta \end{pmatrix} \begin{pmatrix} x - x_0' \\ y - y_0' \end{pmatrix}$$

$X_0' = xt_1 - (S \cdot xf_1 \cdot \cos\theta - S \cdot yf_1 \cdot \sin\theta)$ $Y_0' = xt_1 - (S \cdot yf_1 \cdot \cos\theta - S \cdot xf_1 \cdot \sin\theta)$ Next, the scale S (e.g., S=0.5) and the drawing coordinate system $X_D$-$Y_D$ are displayed on the display screen (step 115; see 7b in FIG. 1) and the processing for setting the drawing coordinate system and scale is terminated.

Thereafter, the figure FIG of the manufactured article on the drawing DRW is defined by repeating the processing of obtaining coordinates (x,y) of points on the drawing DRW in the table coordinate system $X_T-X_T$ and transforming these coordinates into coordinates (x',y') in the drawing coordinate system $X_D-Y_D$ using the transformation matrix obtained above.

Thus, in accordance with the present invention, it is arranged to obtain the coordinates of two points on a figure, the coordinates of which two points are known in a drawing coordinate system, in a tablet coordinate system, calculate the distance between the two points in the tablet coordinate system, calculate the distance between the two points in the drawing coordinate system using keyed.in coordinates of the two points in the drawing coordinate system, obtain a scale of the figure by comparing the distance between the two points in the drawing coordinate system and the distance between the two points in the tablet coordinate system, and set the drawing coordinate system on the drawing based on the scale and the two known points. This makes it possible to define the shape of a manufactured article easily and quickly, as a result of which NC data obtained based upon shape definition data can also be created easily and quickly.

We claim:

1. A drawing coordinate system and scale setting method for automatically setting in a tablet device a drawing coordinate system and a scale S of a figure drawn on a drawing placed on a tablet surface having a tablet coordinate system comprising the steps of:
    (a) obtaining coordinates $(x_{t1}, y_{t1})$, $(x_{t2}, y_{t2})$ in the tablet coordinate system by touching two points $P_1$ and $P_2$ on the figure;
    (b) calculating a distance between said two points in the tablet coordinate system;
    (c) inputting coordinates $(x_{f1}, y_{f1})$, $(x_{f2}, y_{f2})$ of said two points $P_1, P_2$ from the drawing coordinate system;
    (d) calculating a distance between said two points in the drawing coordinate system using the coordinates of said two points $P_1, P_2$ in the drawing coordinate system;
    (e) obtaining the scale S of the figure by using the distance between said two points in the drawing coordinate system and the distance between said two points in the tablet coordinate system;
    (f) obtaining in the table coordinate system a line segment $P_1,O_1$ being parallel to an X axis of the drawing coordinate system, where $O_1$ represents a point of intersection between a circle whose center is the point $P_1$ and whose radius is $S * |x_{f2}-x_{f1}|$, and a circle whose center is the point $P_2$ and whose radius is $S * |y_{f2}-y_{f1}|$;
    (g) setting in the tablet device coordinates defining a straight line as a Y axis of the drawing coordinate system, which is perpendicular to the line segment $P_1 O_1$ passing through a point $P_0$ that is on an extension of line segment $P_1 O_1$ and located at a distance of $S * x_{f1}$ from the point $P_1$; and
    (h) setting in the tablet device coordinates defining a point as an origin of the drawing coordinate system which is on the Y axis at a distance of $S * y_{f1}$ from the point $P_0$
    (i) displaying the drawing coordinate system.

2. A drawing coordinate system and scale setting method according to claim 1, further comprising the steps of:
    determining an inclination (74 (angle) between the tablet coordinate system and the drawing coordinate system;
    obtaining a transformation matrix, which is for transforming coordinates in the tablet coordinate system into coordinates in the drawing coordinate system, by using the scale S, said inclination $\theta$, and coordinates of the point $P_1$ in both of the coordinate systems;
    obtaining said coordinates of points on the drawing in the tablet coordinate system; and
    transforming said coordinates of the tablet coordinate system into said coordinates in the drawing coordinate system by said transformation matrix.

* * * * *

UNITED STATES PATENT AND TRADEMARK OFFICE
CERTIFICATE OF CORRECTION

PATENT NO. : 5,075,873  Page 1 of 2

DATED : December 24, 1991

INVENTOR(S) : Seki et al.

It is certified that error appears in the above-identified patent and that said Letters Patent is hereby corrected as shown below:

col. 1, equation (2), change "Yo.sine" to --S.Yo.Sine--,        col. 1, equation (3), change "+Yo.sine" to --S.$X_0$.sine--,        col. 1, equation (4), change "/$X_2$-$x_1$)" to --/($X_2$-$X_1$)--.

col. 3, line 50, change "$p_2$" to --$P_2$--,        col. 4, line 50, change "θD" to --$θ_D$--,        col. 4, line 55, change "(X,,Y,) to --(X', Y')--,

UNITED STATES PATENT AND TRADEMARK OFFICE
CERTIFICATE OF CORRECTION

PATENT NO. : 5,075,873

DATED : December 24, 1991

INVENTOR(S) : Seki, et al

It is certified that error appears in the above-identified patent and that said Letters Patent is hereby corrected as shown below:

```
        col. 6, line 7, change "table" to --
tablet--, col. 6, line 28, change "(74(angle)" to
--(θ(angle)--.
```

Signed and Sealed this

Twenty-second Day of June, 1993

Attest:

MICHAEL K. KIRK

*Attesting Officer*    *Acting Commissioner of Patents and Trademarks*